(12) United States Patent  
Fadell

(10) Patent No.: US 8,344,874 B2
(45) Date of Patent: Jan. 1, 2013

(54) INTELLIGENT POWER-ENABLED COMMUNICATIONS PORT

(75) Inventor: Anthony Fadell, Portola Valley, CA (US)

(73) Assignee: Apple Inc., Cupertino, CA (US)

(*) Notice: Subject to any disclaimer, the term of this patent is extended or adjusted under 35 U.S.C. 154(b) by 596 days.

(21) Appl. No.: 12/463,137

(22) Filed: May 8, 2009

(65) Prior Publication Data

US 2010/0007473 A1 Jan. 14, 2010

Related U.S. Application Data

(60) Provisional application No. 61/079,752, filed on Jul. 10, 2008.

(51) Int. Cl.
  *G08B 1/08* (2006.01)
(52) U.S. Cl. ........................................... 340/538
(58) Field of Classification Search .......... 340/538, 340/538.11–538.17; 713/300
See application file for complete search history.

(56) References Cited

U.S. PATENT DOCUMENTS

| | | | |
|---|---|---|---|
| 6,668,296 B1 | 12/2003 | Dougherty et al. | |
| 2002/0162036 A1* | 10/2002 | Kim et al. | 713/300 |
| 2003/0062990 A1 | 4/2003 | Schaeffer, Jr. et al. | |
| 2003/0167347 A1 | 9/2003 | Combs et al. | |
| 2004/0186926 A1* | 9/2004 | Rapaich | 710/8 |
| 2005/0053087 A1 | 3/2005 | Pulyk | |
| 2005/0138446 A1 | 6/2005 | Matsuda | |
| 2006/0214510 A1* | 9/2006 | Patel | 307/12 |
| 2007/0271398 A1* | 11/2007 | Manchester et al. | 709/249 |
| 2008/0199001 A1* | 8/2008 | Young | 379/399.01 |
| 2008/0318474 A1 | 12/2008 | Crotinger et al. | |

FOREIGN PATENT DOCUMENTS

| | | |
|---|---|---|
| EP | 1816571 A1 | 8/2007 |
| WO | 2008066687 A2 | 6/2008 |
| WO | 2008066687 A3 | 6/2008 |

* cited by examiner

*Primary Examiner* — Phung Nguyen
(74) *Attorney, Agent, or Firm* — Womble Carlyle Sandridge & Rice LLP

(57) ABSTRACT

A port that supplies power in accordance with a standard is equipped with a variable power supply and a power line communications module. Power line signals on the power conductors are used to allow a port controller to negotiate power requirements with peripheral devices and the power supply is adjusted accordingly. If the peripheral device does not support such negotiation, power is delivered in accordance with the standard. The port may be a data communications port that supplies power and data in accordance with a standard.

25 Claims, 5 Drawing Sheets

INTELLIGENT POWER-ENABLED COMMUNICATIONS PORT

CROSS REFERENCE TO RELATED APPLICATIONS

This application claims the benefit of copending, commonly-assigned U.S. Provisional Patent Application No. 61/079,752, filed Jul. 10, 2008, which is hereby incorporated by reference herein in its entirety.

BACKGROUND OF THE INVENTION

This relates to more efficient delivery of power through a power-enabled communications port.

A number of different data communications standards allow devices, such as personal computers, to provide power to peripheral devices via data connections. As just two examples, the Universal Serial Bus ("USB") and IEEE1394 ("FireWire") standards provide power as well as data connectivity. As a result of the availability of power from these types of data ports, an ever-increasing variety of devices are becoming available that draw their power from such a power-enabled data port.

While originally all such devices were computer peripheral-type devices such as, for example, network adapters, printers or storage devices, an increasing number of such devices are not data devices at all or have only minimal data functions. For example, mobile telephones can be connected via such ports to a computer for the purpose of transferring data files (e.g., photographs taken with the telephone's camera), but the telephone also can be charged using that connection. Many users find it more convenient to charge their mobile telephones via the data connection even though they may have no data to transfer. As a further example, one available type of a device with absolutely no data functions is a warming plate for a coffee mug, designed to be powered from a USB port.

The standards for power-enabled communications ports specify how much power or current must be available from an individual port. For example, the USB standard provides a maximum of 500 mA of current at 5 V. As devices are introduced that demand more and more power, the standards must continually be upgraded.

SUMMARY OF THE INVENTION

In accordance with the present invention, rather than continually upgrade standards such as the USB or FireWire standards, a variable power supply may be provided for the power conductor of a port operating according to such a standard. The power supply may supply, at a minimum, the amount of power called for by the standard. In addition, the port controller may impress a communications signal upon the power transmission on the power conductors, of a nature similar to that used for power line communications (also known as power line networking), and may use that signal to negotiate with a device connected to the port to determine how much power to supply.

A peripheral device to be connected to such a port preferably would include software enabling it to negotiate with the port. The peripheral device would ask for a maximum amount of power for which it is rated. The port would be limited to supplying the amount of power that its power supply is capable of delivering, but might deliver less than that maximum if peripheral devices requiring power are connected to other ports connected to the same power supply. In such a case the port controller would report to each peripheral device how much power it has available and the port controller and each peripheral device would "agree" on an amount of power to be delivered. If agreement is not reached—e.g., if a particular peripheral device has a minimum power requirement greater than the power controller is able to agree to (e.g., greater than the amount of power available from the power supply when considering the requirements of the other ports)—then preferably the peripheral device will not activate, to prevent damage to itself as well as to the power supply, the port, the host device, and possibly other ports on the host device and the peripheral devices connected to those ports.

In addition, in some embodiments of the invention, it may be possible to adjust the delivered power to the capacity of the cable connecting the peripheral device to the communications port. In such an embodiment, where appropriate sensing capabilities and software are provided, the I-R drop across the cable can be measured to determine the current capacity of the cable, and the delivered power can be reduced as necessary to prevent overload of the cable, thereby preventing damage both to the cable, and the peripheral and host devices. As a variant of such an embodiment, it may be possible to adjust the voltage to compensate for the current limitations of the cable. Specifically, the amount of power that can be delivered at the maximum current capacity of the cable can be increased by increasing the voltage (within the limits of the voltage specifications of the host device and the peripheral device).

The use of power line communications to carry out the power negotiation technique of the invention allows that technique to operate without altering the existing standards for power-enabled communications ports. The technique of the invention is backward-compatible with existing standards. A port equipped with the present invention can be designed so that if the peripheral device connected to the port does not support the power line communications technique of the invention (or if communications cannot be established for any reason), the port will simply deliver power in accordance with the existing standard for that port (e.g., USB or FireWire).

In a further embodiment, power-enabled data ports may be built into premises wiring of buildings to provide power in addition to, or in place of, conventional alternating-current mains power receptacles. The inclusion of such built-in ports in premises wiring would allow the powering of direct-current devices without the use of bulky AC-DC adapters as are now required, each of which may be unique to the device being powered. However, because different devices would still have different power requirements, such a built-in power-enabled port may still use the present invention to negotiate with any device plugged into it to determine how much power to deliver. Such a built-in power-enabled port may be used only for power delivery, or may be used for data purposes as well, such as local-area networking within the premises and/or delivery of an Internet connection.

Power-enabled ports built into premises according to this invention may be powered from one or more centrally-located power supplies. For example, there may be one power supply located in a utility area (e.g., the basement) of a building, or there may be, e.g., one power supply per floor of the building. The centrally-located power supply may be connected to the building mains power, and may include not only a variable power supply as described herein, but also a controller, as described, for negotiating with power-consuming devices.

Alternatively, each built-in power-enabled port in a building may have its own variable power supply and controller. The power supply may in turn draw power from a nearby source of mains voltage. In one embodiment, the built-in power-enabled port may be located near a mains voltage receptacle and have a power supply that draws its power from the mains voltage. In a variant of this embodiment, the mains voltage receptacle and the built-in power-enabled port according to the invention may be located in the same junction box, and may be presented to users on the same wall plate. Indeed, the mains voltage receptacle and the built-in power-enabled port may be included in single wiring device. Of course, a built-in power-enabled port may be presented to users on the same wall plate as a mains voltage receptacle even where the power-enabled port derives power from a central power supply remote from the mains voltage receptacle.

Therefore, in accordance with the present invention, there is provided a method of operating a communications port of a host device to provide power and data connectivity to a peripheral device. The communications port has power conductors and data conductors and the method includes establishing a communications channel on the power conductors using a power line communications protocol, attempting to negotiate, between the host device and the peripheral device on that communications channel, an amount of power to be delivered by the host device to the peripheral device via the power conductors, and upon conclusion of successful negotiation, delivering that amount of power via the power conductors.

A communications port that operates according to the method, and systems including such a port, also are provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

Figure 1:
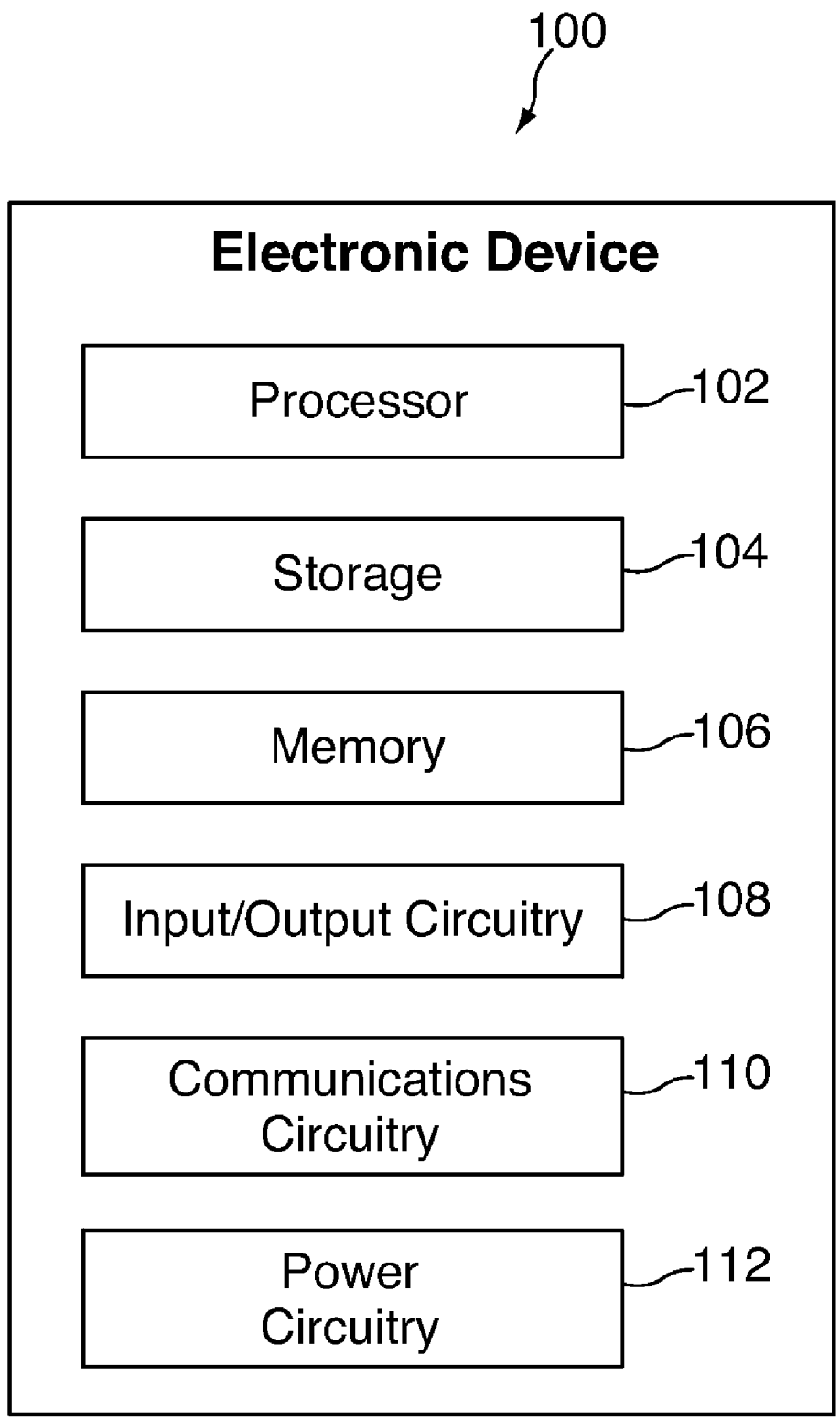
FIG. 1 is a schematic view of an illustrative electronic device in accordance with one embodiment of the invention.

FIG. 1 is a schematic view of an illustrative electronic device in accordance with one embodiment of the invention. Electronic device 100 can include control circuitry 102, storage 104, memory 106, input/output circuitry 108, communications circuitry 110, and power circuitry 112. In some embodiments, one or more of electronic device components 100 can be combined or omitted (e.g., combine storage 104 and memory 106). In some embodiments, electronic device 100 can include other components not combined or included in those shown in FIG. 1 (e.g., motion detection components, a display, bus, or input mechanism), or several instances of the components shown in FIG. 1. For the sake of simplicity, only one of each of the components is shown in FIG. 1.

Control circuitry 102 can include any processing circuitry or processor operative to control the operations and performance of electronic device 100. For example, control circuitry 100 can be used to run operating system applications, firmware applications, media playback applications, media editing applications, or any other application. In some embodiments, the control circuitry can drive a display and process inputs received from a user interface.

Storage 104 can include, for example, one or more storage mediums including a hard-drive, solid state drive, flash memory, permanent memory such as ROM, any other suitable type of storage component, or any combination thereof. Storage 104 can store, for example, media data (e.g., music and video files), application data (e.g., for implementing functions on device 100), firmware, user preference information data (e.g., media playback preferences), authentication information (e.g. libraries of data associated with authorized users), lifestyle information data (e.g., food preferences), exercise information data (e.g., information obtained by exercise monitoring equipment), transaction information data (e.g., information such as credit card information), wireless connection information data (e.g., information that can enable electronic device 100 to establish a wireless connection), subscription information data (e.g., information that keeps track of podcasts or television shows or other media a user subscribes to), contact information data (e.g., telephone numbers and email addresses), calendar information data, and any other suitable data or any combination thereof.

Memory 106 can include cache memory, semi-permanent memory such as RAM, and/or one or more different types of memory used for temporarily storing data. In some embodiments, memory 106 can also be used for storing data used to operate electronic device applications, or any other type of data that can be stored in storage 104. In some embodiments, memory 106 and storage 104 can be combined as a single storage medium.

Input/output circuitry 108 can be operative to convert (and encode/decode, if necessary) analog signals and other signals into digital data. In some embodiments, input/output circuitry 108 can also convert digital data into any other type of signal, and vice-versa. For example, input/output circuitry 108 can receive and convert physical contact inputs (e.g., from a multi-touch screen), physical movements (e.g., from a mouse or sensor), analog audio signals (e.g., from a microphone), or any other input. The digital data can be provided to and received from processor 102, storage 104, memory 106, power circuitry 112, or any other component of electronic device 100. Although input/output circuitry 108 is illustrated in FIG. 1 as a single component of electronic device 100, several instances of input/output circuitry can be included in electronic device 100.

Electronic device 100 can include any suitable mechanism or component for allowing a user to provide inputs to input/output circuitry 108. For example, electronic device 100 can include any suitable input mechanism, such as for example, a button, keypad, dial, a click wheel, or a touch screen. In some embodiments, electronic device 100 can include a capacitive sensing mechanism, or a multi-touch capacitive sensing mechanism. Some sensing mechanisms are described in commonly owned Hotelling et al. U.S. Published Patent Application No. 1006/0026521, filed Jul. 30, 1004, entitled "Gestures for Touch Sensitive Input Device," and Hotelling et al. U.S.

Published Patent Application No. 1006/0026535, filed Jan. 18, 2005, entitled "Mode-Based Graphical User Interfaces for Touch Sensitive Input Device," both of which are incorporated herein in their entirety.

In some embodiments, electronic device 100 can include specialized output circuitry associated with output devices such as, for example, one or more audio outputs. The audio output can include one or more speakers (e.g., mono or stereo speakers) built into electronic device 100, or an audio component that is remotely coupled to electronic device 100 (e.g., a headset, headphones or earbuds that can be coupled to communications device with a wire or wirelessly).

In some embodiments, I/O circuitry 108 can include display circuitry (e.g., a screen or projection system) for providing a display visible to the user. For example, the display circuitry can include a screen (e.g., an LCD screen) that is incorporated in electronics device 100. As another example, the display circuitry can include a movable display or a projecting system for providing a display of content on a surface remote from electronic device 100 (e.g., a video projector). In some embodiments, the display circuitry can include a coder/decoder (Codec) to convert digital media data into analog signals. For example, the display circuitry (or other appropriate circuitry within electronic device 100) can include video Codecs, audio Codecs, or any other suitable type of Codec.

The display circuitry also can include display driver circuitry, circuitry for driving display drivers, or both. The display circuitry can be operative to display content (e.g., media playback information, application screens for applications implemented on the electronic device, information regarding ongoing communications operations, information regarding incoming communications requests, or device operation screens) under the direction of control circuitry 102. Alternatively, the display circuitry can be operative to provide instructions to a remote display (e.g., display 130, FIG. 1).

Communications circuitry 110 can include any suitable communications circuitry operative to connect to a communications and to transmit communications (e.g., voice or data) from communications device 100 to other devices within the communications network. Communications circuitry 110 can include any suitable communications port operative to enable wireless or wired communications. In some embodiments, communications circuitry 110 can include circuitry and antennas operative to interface with a wireless communications network using any suitable communications protocol such as, for example, Wi-Fi (e.g., a 802.11 protocol), Bluetooth®, radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol. In some embodiments, communications circuitry 110 can include one or more communications ports operative to receive a wire or cable and transfer data across the wire or cable. For example, communications circuitry 110 can include ports for receiving connectors associated with particular communications protocols, such as an RJ45 Ethernet, USB, FireWire, or other suitable connectors or plugs.

Electronic device 100 can include one more instances of communications circuitry 110 for simultaneously performing several communications operations using different communications networks, although only one is shown in FIG. 1 to avoid overcomplicating the drawing. For example, electronic device 100 can include a first instance of communications circuitry 110 for communicating over a cellular network, and a second instance of communications circuitry 110 for communicating over Wi-Fi or using Bluetooth®, a third instance of communications circuitry 110 for providing one or more USB ports, and a fourth instance of communications circuitry 110 for providing one or more FireWire ports.

In some embodiments, electronic device 100 can be coupled a host device for data transfers, synching the communications device, software or firmware updates, providing performance information to a remote source (e.g., providing riding characteristics to a remove server) or performing any other suitable operation that can require electronic device 100 to be coupled to a host device. Several electronic devices 100 can be coupled to a single host device using the host device as a server, and instead or in addition electronic device 100 can be coupled to several host devices (e.g., for each of the plurality of the host devices to serve as a backup for data stored in electronic device 100). In some embodiments, electronic device 100 can be coupled to a host device or a periphery device to transfer power, for example to be powered or be charged by the host device, or to power or charge the periphery device. The electronic device can use any suitable component Power circuitry 112 can include any suitable circuitry for providing power to components of electronic device 100. For example, power circuitry 112 can include one or more of a battery (e.g., a gel, nickel metal hydride, nickel cadmium, nickel hydrogen, lead acid, or lithium-ion battery), an uninterruptible or continuous power supply (UPS or CPS), and circuitry for processing power received from a power generation source (e.g., power generated by an electrical power plant and delivered to the user via an electrical socket). The received power can be provided as alternating current or direct current, and processed to transform power or limit received power to particular characteristics. For example, received power can be transformed to or from direct current, and constrained to one or more values of average power, effective power, peak power, energy per pulse, voltage, current (e.g., measured in amperes), or any other characteristic of received power. In particular, power circuitry 112 can be rated for particular voltage or current amounts, or require minimum or maximum voltage and current for proper operation. In some embodiments, power circuitry 112 can be coupled to communications circuitry 110 or be coupled or incorporated with communications circuitry to provide a mechanism for simultaneously transferring data and power using one or more protocols (e.g., using a USB or FireWire connector with the corresponding protocol).

Using a communications port of the device, one or more peripheral devices can be coupled to the electronic device. If the communications port is coupled with or includes power circuitry, power can be provided from the electronic device to the one or more peripheral devices. The periphery device can include, for example, a printer, mouse, keyboard, communications accessory (e.g., a Bluetooth adapter or cellular data card), mobile device (e.g., cellular telephone or portable media device), audio components (e.g., speakers, a microphone, or a sound card), digital camera, mass storage device (e.g., flash drive, memory card reader, or an external drive), hub (e.g., USB hub), smart card reader, webcam, authentication device (e.g., fingerprint dongle), or any other device operative to receive or transmit data to the electronic device. In some embodiments, the periphery device can include a device operative to receive only power from the electronic device. Such devices can include, for example, a light, hot plate, cooler or refrigeration system, solar charger, or any other suitable device.

Each peripheral device coupled to the electronic device can receive power from the electronic device power supply. Each peripheral device, however, can require different amounts of power, based for example on the components of the peripheral device, the power allocation as determined by a protocol, or any other suitable criteria. In some embodiments, the power requirements of each peripheral device can be different, for example due to changes in protocols over time, or other power sources available to each device (e.g., a peripheral device can include a battery, or be directly connected to a power source).

The transfer of power to each peripheral device can be controlled using any suitable approach. In some embodiments, a communications protocol associated with the type of physical connector (e.g., the type of plug and port used for the peripheral device) can define power standards, such as minimum and/or maximum power, current (e.g., 100 mA to 1.8 A) or voltage limit (e.g., voltage between 4.75 and 5.25 V). As devices evolve, however, they can require more power than is provided by the maximum limit of an existing protocol power standard. The power standard must then be modified to allow more power intensive peripherals to operate properly.

To allow peripheral devices to operate properly despite limitations due to the communications protocol power settings, a separate communications protocol can be grafted to the existing standard to control the delivery of power. The separate communications protocol can include, for example, a power line communications protocol. Any one of the many power line communications protocols currently available or under development may be used. These can include the X10 protocol currently used primarily for home automation, or any of the protocols of the HomePlug Powerline Alliance, of which the HomePlug 1.0 networking protocol is an example. Other protocols in various stages of development that may be used include those being developed by the Universal Powerline Association, the European Telecommunications Standards Institute, the Consumer Electronics Powerline Communications Alliance, the Open PLC European Research Alliance (OPERA) being funded by the European Commission, the G.hn standard of the ITU Telecommunication Standardization Sector (ITU-T) of the International Telecommunication Union (ITU), or the IEEE 643-2004 standard of the Institute of Electrical and Electronics Engineers.

Figure 2A:
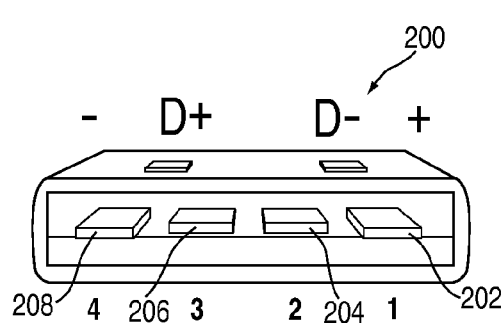
FIGS. 2A and 2B are schematic views of illustrative ports for use in an electronic device in accordance with one embodiment of the invention.
Figure 2B:
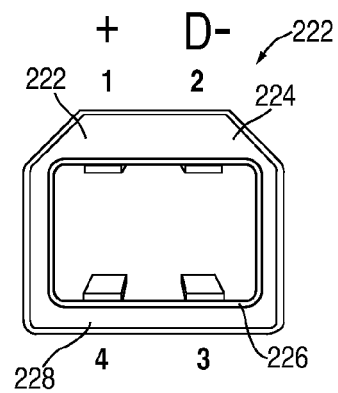

Each communications port operative to receive a connector from a peripheral device can include power conductors or pins and data conductors or pins. FIGS. 2A and 2B are schematic views of illustrative ports for use in an electronic device in accordance with one embodiment of the invention. Ports 200 and 220 can include several pins operative to conduct one or more of power and data. For example, ports 200 and 220 can include power pins 202 and 208, and 222 and 228, respectively, and data pins 204 and 206, and 224 and 226, respectively. The particular position of each of the power and data pins can be determined using any suitable approach, including for example based on the standard associated with the connector.

Figure 3:
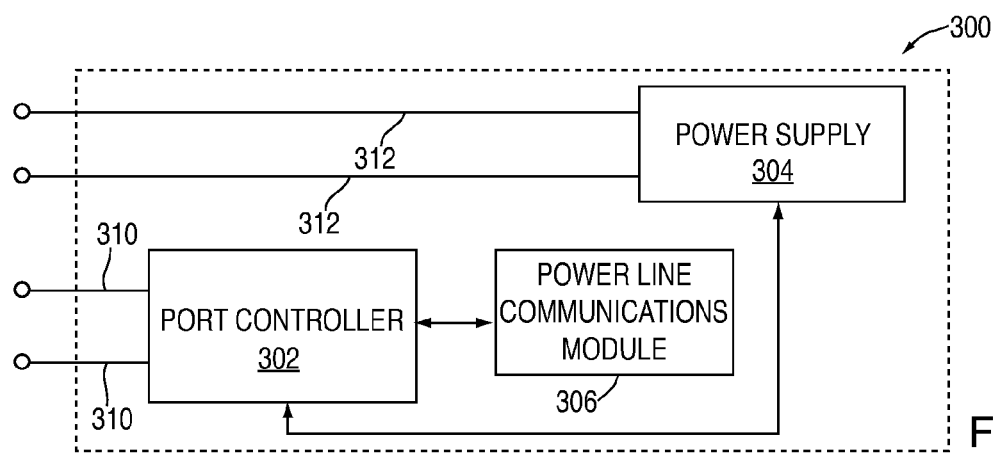
FIG. 3 is a schematic view of illustrative components of a connector in accordance with one embodiment of the invention.

The transfer of data and power through the connector can be controlled by any suitable component of the electronic device or in the port. FIG. 3 is a schematic view of illustrative components of a connector in accordance with one embodiment of the invention. Connector 300 can include port controller 302, power supply 304 and power line communications module 306. Port controller 302 can be operative to mediate data communications on data pins 310 of the connectors, and can buffer power pins 312 of the connectors to allow "hot plugging" of peripheral devices. Power can be provided to power pins 312 using power supply 304, which can include a variable power supply under the control of controller 302.

Power line communications module 306, using a suitable standard such as one of the standards described above, may allow controller 302 to negotiate with a peripheral device over pins (e.g., pins 204 and 206, or pins 224 and 226, FIGS. 2A and 2B, respectively). In particular, module 306 can determine the power available for the peripheral device from power supply 304, and the power required or requested by the peripheral device (e.g., received via communications controlled by port controller 302. If the peripheral device requires more power than is available using the power standard of the communications protocol, the peripheral device and module 306 can negotiate to provide an amount of power that is not within the limits of the protocol, but ensures that both the electronic device and host device operate properly.

Figure 4:
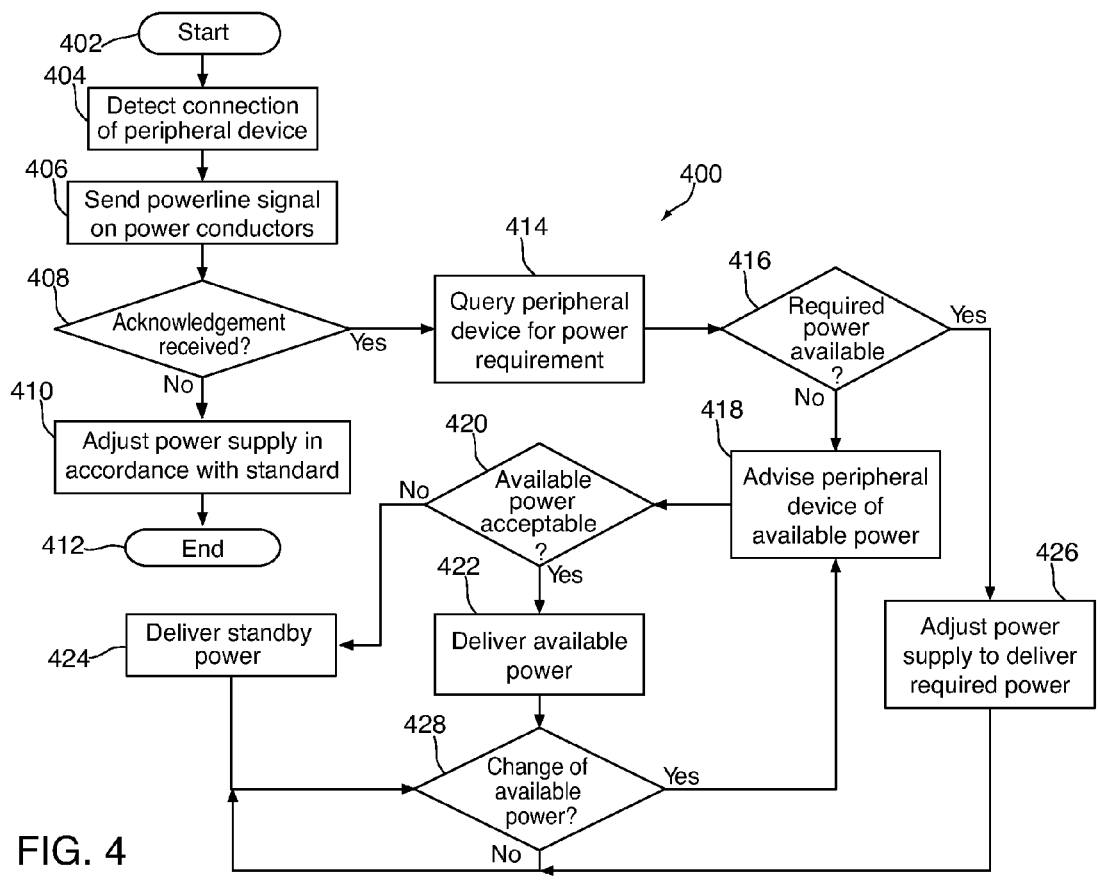
FIG. 4 is a flowchart of an illustrative process for determining the amount of power to provide to a peripheral device coupled to a host device in accordance with one embodiment of the invention.

Module 306 can use any suitable approach to determine how much power to supply to the peripheral device. FIG. 4 is a flowchart of an illustrative process for determining the amount of power to provide to a peripheral device coupled to a host device in accordance with one embodiment of the invention. Process 400 can begin at step 402. At step 404, the electronic device can detect the connection of a peripheral device to a communications port (e.g., port 200 or port 220, FIGS. 2A and 2B). For example, the electronic device can detect an initial communication using a port controller (e.g., port controller 302, FIG. 3). At step 406, the port controller can used a power line communications module (e.g., module 30, FIG. 3) to impress power line signals on power conductors or pin. For example, the port controller can ping or request acknowledgement from the peripheral device to ensure that proper communications and data transfers can take place. At step 408, the electronic device can determine whether an acknowledgment has been received. For example, the port controller can await a response indicated by the communications protocol in response to the initial ping. If no acknowledgment has been received, it may be assumed that the peripheral device is not equipped to communicate using power line communications (or that there is some other problem with the peripheral device), and process 400 can move to step 410. At step 410, the electronic device can direct the port controller to adjusts a variable power supply (e.g., variable power supply 304, FIG. 3) to deliver the amount of power specified by the standard for the port (e.g., the power standard set by the protocol associated with the type of connector or port used by the electronic device). Process 400 can then end at step 412.

If, at step 408, the electronic device instead receives an acknowledgment process 400 can move to step 414. At step 414, the electronic device can query the peripheral device to determine its power requirements. For example, a port controller can transmit a request using the powerline communications protocol to determine the power requirements of the peripheral device. At step 416, the electronic device can determine whether it has sufficient power available to satisfy the power requirements of the peripheral device. For example, the electronic device can determine the maximum power output of a variable power supply. As another example, the electronic device can determine the power requirements of other peripheral devices connected to other ports of the electronic device, and whether the power provided to other peripheral devices can be reduced (e.g., based on a prioritization scheme, or a user provided indication of the relative importance of peripheral devices). If the electronic device determines that insufficient power is available, process 400 can move to step 418.

At step 418, the electronic device can advise the peripheral device of the amount of power available, and query the peripheral device whether the amount of available power is sufficient or acceptable. At step 420, the electronic device can receive an indication from the peripheral device as to whether the available amount of power available is acceptable. For example, the port controller can receive a communication indicating whether the available power is acceptable for the peripheral device. If the electronic device receives an indication that the available power is acceptable, process 400 can move to step 422. At step 422, the electronic device can provide the available power to the peripheral device. Process 400 can then move to step 428.

If, at step 420, the electronic device instead receives a communication indicating that the available power is not acceptable for the peripheral device, process 400 can move to step 424. At step 424, the electronic device can provide only standby power to the peripheral device, which may prevent the peripheral device from operating but may also prevent damage to the power supply, the electronic device port, the peripheral device, other peripheral devices connected to the electronic device, or even the electronic device. Alternatively, when negotiations are unsuccessful, the default amount of power specified by the port standard may be delivered (e.g., instead of standby power).

If, at step 416, the electronic device instead determines that the power required by the peripheral device is available, process 400 can instead move to step 426. At step 426, the electronic device can provide the require power to the peripheral device. For example, the controller can direct the variable power supply to adjust the power output to deliver the required power to the peripheral device. Process 400 can then move to step 428. In addition, after steps 422 and 424, process 400 can also move to step 428. At step 428, the electronic device can determine whether there has been a change in available power. For example, the electronic device can monitor whether the number of peripheral devices has changed (e.g., a previous peripheral device has been removed, increasing the available power, or a new peripheral device has been added, decreasing the available power). If the available power has not changed, process 400 can return to step 428 and continue monitoring the available power. If, at step 428, the electronic device instead determines that the available power has changed, process 400 can return to step 418 and advise the peripheral device of the power available. If the peripheral device is disconnected from the electronic device, process 400 can end.

Figure 5:
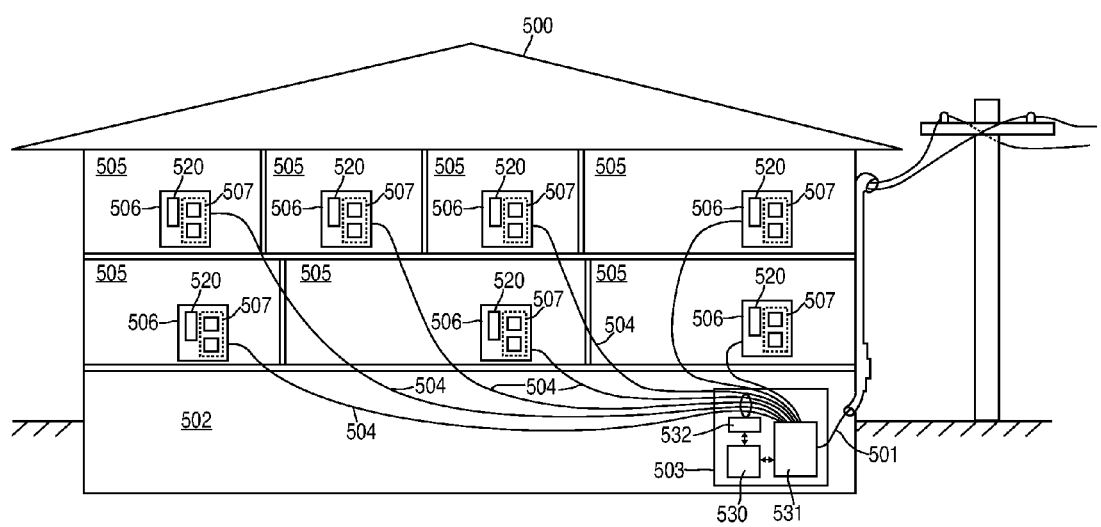
FIG. 5 is a schematic view of an illustrative building having embedded power-enabled data ports for coupling peripheral devices in accordance with one embodiment of the invention.

In some embodiments, peripheral devices can be connected directly to a power supply, eliminating the intermediary of a host electronic device. For example, power outlets in a building can include power enabled data ports with port controllers operative to control the power provided to the connected peripheral devices. FIG. 5 is a schematic view of an illustrative building having embedded power-enabled data ports for coupling peripheral devices in accordance with one embodiment of the invention. Building 500 can receive power via mains power service 501 delivered to basement 502 of building 500, where it is connected to power supply and control circuitry 503 (as well as, in most cases, to a standard mains power distribution system (not shown)). Like the circuitry shown in FIG. 3, circuitry 503 can include controller 530, power supply 531 that may be variable under the control of controller 530, and power line communications module 532. Controller 530, power supply 531 and power line communications module 532 may operate like controller 302, power supply 304 and power line communications module 306, except that they are sized to serve an entire building 500.

From supply and control circuitry 503, power conductors 504 may distribute power to individual power-enabled ports 520 in various rooms 505 of building 500. Although only one port 520 is shown per room 505, more than one port 520 may be provided in each room 505. Moreover, although each port 520 is based on a power-enabled data port, port 520 may be used only to deliver power in accordance with the present invention. Alternatively, port 520 may be used for data purposes as well, including data networking within building 500, as well as distribution of an external data source, such as the Internet (not shown), within building 500.

As shown in FIG. 5, each port 520 can share a location 506 with a mains power receptacle, depicted as a conventional North American duplex receptacle 507, each of which can be connected to mains power service 501 by connections not shown. Preferably, at location 506, port 520 and receptacle 507 share a faceplate and therefore a junction box. Receptacle 507 also may be omitted from location 506 and provided elsewhere (or not at all if all household electrical devices can be configured to run on the power provided by ports 520).

Figure 6:
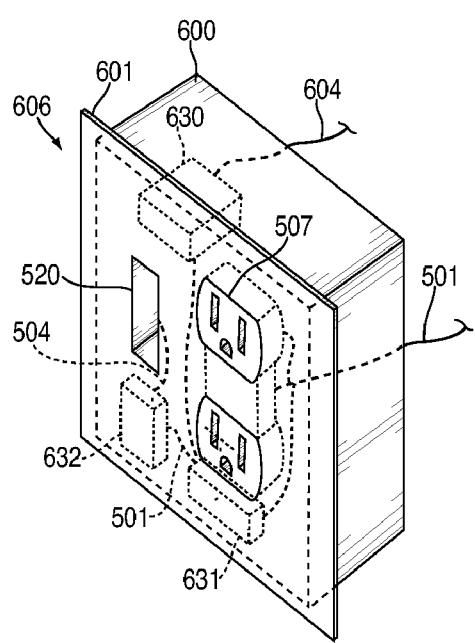
FIG. 6 is a diagram of a junction box incorporating a port according to the present invention along with a mains power receptacle.

In an alternate embodiment shown in FIG. 6, circuitry 503 in basement 502 may be eliminated. Instead, each location 606 can include a port 520 and mains power receptacle 507 (served by mains service 501) can share a junction box 600 and a faceplate 601. Also inside junction box 600 are a In some embodiments, variable power supply 631 (which converts mains AC power from service 501 to variable DC power for port 520 in accordance with the invention), power line communications module 632, and port controller 630 can be provided inside junction box 600. Port controller 630, power supply 631, and power line communications module 632 can together provide variable power to port 520 in accordance with the present invention based on negotiations with devices connected to port 520. Although in this embodiment, conductors 504 can be wholly internal to junction box 600 and therefore cannot bring data from outside location 506, external data conductors 604 may be provided if ports 520 are to be used to provide data services as well.

Figure 7:
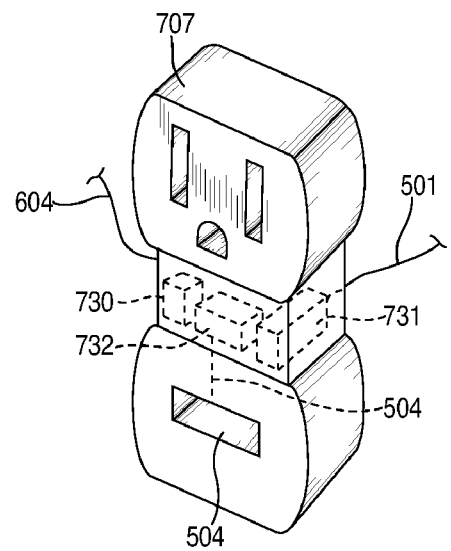
FIG. 7 is a single wiring device incorporating both a port according to the present invention along with a mains power receptacle.

In a further embodiment, shown in FIG. 7, wiring device 707 is provided. Wiring device 707 can be similar to duplex receptacle 507, except that one of the two mains power receptacles can be replaced by port 520. Further, variable power supply 731 (which converts mains AC power from service 501 to variable DC power for port 520 in accordance with the invention), power line communications module 732, and port controller 730, which together provide variable power to port 520 in accordance with the present invention based on negotiations with devices connected to port 520, can all contained within wiring device 707. Wiring device 707 can therefore be installed in any standard wiring box where mains service 501 is available to provide power in accordance with the invention. However, if port 520 is to provide data service as well, external data conductor 604 also must be provided at the wiring box.

Thus it is seen that a data communications port that supplies power and data in accordance with a standard, but is equipped with a variable power supply and a power line communications module so that power line signals on the power conductors can be used to allow a port controller to negotiate power requirements with peripheral devices, has been provided. A power distribution system based on such ports also has been provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A method of operating a communications port of a host device to provide power and data connectivity to a peripheral device, said communications port having power conductors and data conductors, said data conductors associated with circuitry that define a legacy standard amount of available power for said communications port, said method comprising:
- establishing a communications channel on said power conductors using a power line communications protocol;
- attempting to negotiate, between said host device and said peripheral device on said communications channel, an amount of power to be delivered by said host device to said peripheral device via said power conductors, wherein the amount of power exceeds the legacy standard amount of available power;
- upon conclusion of successful negotiation, delivering said amount of power via said power conductors.

2. The method of claim 1 further comprising:
upon failure of negotiation based on inability to connect via said communications channel, delivering a default amount of power via said power conductors.

3. The method of claim 2 wherein said default amount of power is defined by a standard governing operation of said communications port.

4. The method of claim 1 further comprising:
upon failure of negotiation based on inability of said host device and said peripheral device to agree on said amount of power, delivering a default amount of power via said power conductors.

5. The method of claim 4 wherein said default amount of power is defined by standard governing operation of said communications port.

6. The method of claim 1 further comprising:
upon failure of negotiation based on inability of said host device and said peripheral device to agree on said amount of power, delivering at most standby power via said power conductors.

7. The method of claim 1 wherein said peripheral device is connected to said communications port of said host device via a cable; said method further comprising:
- measuring characteristics of said cable; and
- adjusting said amount of power based on said characteristics.

8. The method of claim 1 wherein said power line communications protocol is a protocol of the HomePlug Powerline Alliance.

9. The method of claim 8 wherein said power line communications protocol is HomePlug 1.0.

10. A method of operating a power port to provide power to a device, said power port having power conductors, said method comprising:
- establishing a communications channel on said power conductors using a power line communications protocol that defines a maximum power limit over said power conductors;
- attempting to negotiate, between said power port and said device on said communications channel, an amount of power to be delivered by said power port to said device via said power conductors;
- determining whether said amount of power to be delivered by said power port to said device exceeds the maximum power limit of said power line communications protocol;
- in response to determining that said amount of power to be delivered by said power port to said device exceeds the maximum power limit of said power line communications protocol, negotiating an amount of power that exceeds the maximum power limit, but ensures that both said device and said power port operate properly; and
- upon conclusion of successful negotiation, delivering said amount of power via said power conductors.

11. The method of claim 10 further comprising:
upon failure of negotiation based on inability to connect via said communications channel, delivering a default amount of power via said power conductors.

12. The method of claim 10 further comprising:
upon failure of negotiation based on inability of said power port and said device to agree on said amount of power, delivering a default amount of power via said power conductors.

13. A power port for providing power to a device, said power port comprising:
- circuitry that defines a legacy standard amount of available power for said power port;
- power conductors;
- a port controller;
- a variable power supply; and
- a power line communications modulator for establishing a communications channel on said power conductors using a power line communications protocol, wherein:
  - said port controller attempts to negotiate with said device on said communications channel, to determine an amount of power to be delivered by said variable power supply to said device via said power conductors; and
  - said amount of power exceeds the legacy standard amount of available power; and
- upon conclusion of successful negotiation, said port controller adjusts said variable power supply to deliver said amount of power via said power conductors.

14. A system comprising:
- a host device;
- a peripheral device;
- a communications port on said host device for providing power and data connectivity between said host device and said peripheral device; and
- a cable connecting said peripheral device to said communications port, wherein:
  - said communications port comprises:
    - power conductors;
    - data conductors;
    - a port controller;
    - a variable power supply; and
    - a power line communications modulator for establishing a communications channel on said power conductors using a power line communications protocol that defines a maximum power limit over said power conductors; and
  - said port controller controls said data connectivity on said data conductors;
  - said port controller further attempts to negotiate with said peripheral device on said communications channel, to determine an amount of power to be delivered by said variable power supply to said peripheral device via said power conductors;
  - said port controller further determines whether said amount of power to be delivered by said variable power supply to said peripheral device exceeds the maximum power limit;
  - in response to determining that said amount of power to be delivered by said variable power supply to said peripheral device exceeds the maximum power limit, said port controller negotiates an amount of power that exceeds the maximum power limit, but ensures that both said peripheral device and said host device operate properly; and upon conclusion of successful negotiation, said port controller adjusts said variable power supply to deliver said amount of power via said power conductors.

15. The system of claim 14 wherein, upon failure of negotiation based on inability to connect via said communications channel, said port controller adjusts said variable power supply to deliver a default amount of power via said power conductors.

16. The system of claim 15 wherein said default amount of power is defined by a standard governing operation of said communications port.

17. The system of claim 14 wherein, upon failure of negotiation based on inability of said port controller and said peripheral device to agree on said amount of power, said port controller adjusts said variable power supply to deliver a default amount of power via said power conductors.

18. The system of claim 17 wherein said default amount of power is defined by a standard governing operation of said communications port.

19. The system of claim 14 wherein, upon failure of negotiation based on inability of said port controller and said peripheral device to agree on said amount of power, said port controller adjusts said variable power supply to deliver at most standby power via said power conductors.

20. A power distribution system comprising:
a plurality of power ports for providing power to a plurality of devices, each power port of the plurality of power ports comprising power conductors;
a system controller;
a variable power supply; and
a power line communications modulator for establishing communications channels on said power conductors using a power line communications protocol, wherein:
said system controller attempts to negotiate with a first device of the plurality of devices on a first communications channel to determine an amount of power to be delivered by said variable power supply to said first device via said power conductors;
said system controller determines the power requirements of other devices of the plurality of devices that are receiving power from the variable power supply and whether power provided to the other devices of the plurality of devices can be reduced;
upon conclusion of successful negotiation, said system controller adjusts said variable power supply to deliver said amount of power via said power conductors; and
upon conclusion of an unsuccessful negotiation and a determination that power provided to the other devices of the plurality of devices can be reduced, said system controller reduces the power provided to the other devices and attempts to negotiate with the first device to determine whether the amount of available power is acceptable.

21. The power distribution system of claim 20 wherein:
at least one of said plurality of power ports further comprises data conductors for delivery of data to a device, each said at least one of said plurality of power ports being a power-enabled communications port; and
said system controller further controls said delivery of data.

22. The power distribution system of claim 21 wherein, upon failure of negotiation based on inability to connect via said communications channel, said system controller adjusts said variable power supply to deliver a default amount of power via said power conductors.

23. The power distribution system of claim 22 wherein said default amount of power is defined by a standard governing operation of each said power-enabled communications port.

24. The power distribution system of claim 21 wherein, upon failure of negotiation based on inability of said system controller and said device to agree on said amount of power, said system controller adjusts said variable power supply to deliver a default amount of power via said power conductors.

25. The power distribution system of claim 24 wherein said default amount of power is defined by a standard governing operation of each said power-enabled communications port.

* * * * *